(12) United States Patent
Wybrow et al.

(10) Patent No.: US 11,945,176 B2
(45) Date of Patent: Apr. 2, 2024

(54) MECHANICAL SHAPING OF COMPOSITE MATERIALS

(71) Applicant: Cytec Industries Inc., Princeton, NJ (US)

(72) Inventors: Tim Wybrow, Likeston (GB); Richard Hollis, Derbyshire (GB); Dean Wright, Derbyshire (GB); Richard Russell, Derbyshire (GB)

(73) Assignee: Cytec Industries, Inc., Princeton, NJ (US)

( * ) Notice: Subject to any disclaimer, the term of this patent is extended or adjusted under 35 U.S.C. 154(b) by 336 days.

(21) Appl. No.: 17/418,978

(22) PCT Filed: Dec. 31, 2019

(86) PCT No.: PCT/US2019/069167
§ 371 (c)(1),
(2) Date: Jun. 28, 2021

(87) PCT Pub. No.: WO2020/142569
PCT Pub. Date: Jul. 9, 2020

(65) Prior Publication Data
US 2022/0111605 A1 Apr. 14, 2022

Related U.S. Application Data

(60) Provisional application No. 62/786,855, filed on Dec. 31, 2018.

(51) Int. Cl.
*B29C 70/46* (2006.01)
*B29C 33/58* (2006.01)
(Continued)

(52) U.S. Cl.
CPC .............. *B29C 70/46* (2013.01); *B29C 33/58* (2013.01); *B29C 35/0805* (2013.01);
(Continued)

(58) Field of Classification Search
CPC ..... B29C 70/46; B29C 70/345; B29C 70/461; B29C 70/541; B29C 70/542;
(Continued)

(56) References Cited

U.S. PATENT DOCUMENTS 3,210,230 A * 10/1965 Tyhurst ................. B29C 70/345
156/278
4,302,499 A * 11/1981 Grisch .................... B29C 70/46
442/268

(Continued)

FOREIGN PATENT DOCUMENTS

| WO | 2017134356 A1 | 8/2017 | |
| WO | WO-2017134356 A1 * | 8/2017 | ........... B29C 70/345 |
| WO | 2018146178 A1 | 8/2018 | |

*Primary Examiner* — Jerzi H Moreno Hernandez
(74) *Attorney, Agent, or Firm* — Osha Bergman Watanabe & Burton LLP

(57) ABSTRACT

A method for shaping a composite material, the method comprising positioning a composite system in a press tool, the press tool comprising a male mold and a corresponding female mold separated by a gap, wherein the male mold and the female mold each independently have a non-planar molding surface, compressing the composite system between the male mold and the female mold by closing the gap between the male mold and the female mold; and maintaining the male mold and the female mold in a closed position until the viscosity of the composite system reaches a level sufficient to maintain a molded shape.

20 Claims, 3 Drawing Sheets

(51) Int. Cl.
  *B29C 35/08*  (2006.01)
  *B29C 70/54*  (2006.01)
  *B29K 105/00* (2006.01)

(52) U.S. Cl.
  CPC .......... *B29C 70/461* (2021.05); *B29C 70/545*
        (2013.01); *B29C 2035/0822* (2013.01); *B29K 2105/0094* (2013.01)

(58) Field of Classification Search
  CPC ... B29C 70/543; B29C 70/545; B29C 70/683; B29C 33/58; B29K 2105/0094; B29K 2105/0872
  See application file for complete search history.

(56) References Cited

U.S. PATENT DOCUMENTS

| | | | | |
|---|---|---|---|---|
| 2006/0252334 | A1* | 11/2006 | LoFaro | B32B 7/10 442/361 |
| 2007/0023975 | A1* | 2/2007 | Buckley | B29C 70/345 264/494 |
| 2010/0051183 | A1* | 3/2010 | Boke | B29C 70/46 156/228 |
| 2018/0162039 | A1 | 6/2018 | Cloud et al. | |
| 2019/0224925 | A1* | 7/2019 | Hamlyn | B29C 70/345 |
| 2021/0402719 | A1* | 12/2021 | Guha | B29C 70/345 |

* cited by examiner

MECHANICAL SHAPING OF COMPOSITE MATERIALS

RELATED APPLICATION

This application is a U.S. national phase entry under 35 U.S.C. § 371 of International Application No. PCT/US2019/069167, filed on Dec. 31, 2019, which claims priority to U.S. provisional application No. 62/786,855, filed Dec. 31, 2018. The entire contents of these applications are explicitly incorporated herein by this reference.

BACKGROUND

Fiber-reinforced polymer composite materials have widespread use in many industries (including aerospace, automotive, marine, industrial, construction, and a wide variety of consumer products), often being preferred because they are lightweight while still exhibiting high strength and corrosion resistance, particularly in harsh environments. Fiber-reinforced polymer composite materials are typically made from either pre-impregnated materials or from resin infusion processes.

Pre-impregnated materials, or "prepregs" generally refer to fibers (such as carbon fibers) impregnated with a curable matrix resin (such as epoxy). The resin content in the prepreg is relatively high, typically 40%-65% by volume. Multiple plies of prepregs may be cut to size for laying up, then subsequently assembled and shaped in a molding tool. In the case where the prepreg cannot be easily adapted to the shape of the molding tool, heating may be applied to the prepregs in order to gradually deform it to the shape of the molding surface.

Fiber-reinforced polymer composite materials may also be made by liquid molding processes that involve resin infusion technologies. These processes include, for example, Resin Transfer Molding (RTM), Liquid Resin Infusion (LRI), Vacuum Assisted Resin Transfer Molding (VARTM), Resin Infusion with Flexible Tooling (RIFT), Vacuum Assisted Resin Infusion (VARI), Resin Film Infusion (RFI), Controlled Atmospheric Pressure Resin Infusion (CAPRI), VAP (Vacuum Assisted Process), Single Line Injection (SLI) and Constant Pressure Infusion (CPI). In a resin infusion process, dry bindered fibers are arranged in a mold as a preform, followed by injection or infusion directly in-situ with liquid matrix resin. After injection or infusion, the resin-infused preform is cured to provide a finished composite article.

For both types of material, the process for three-dimensional shaping (or molding) of the composite material is critical to the appearance, properties and performance of the final molded product. For example, preforms are often shaped into detailed geometries using a hand layup process, which is time consuming and often results in significant part-to-part variation. While other, less manual, methods also exist for shaping composite materials (such as vacuum forming methods which may also employ pins, robots and/or actuators to aid in part formation), such methods have their own disadvantages and shortcomings. For example, vacuum methods are considered "offline", because formation and curing occur in different process steps. In addition, such methods are often time consuming and do not take the rheological behavior and cure characteristics of the composite materials into consideration. And the product of such processes is still prone to wrinkling and other imperfections.

SUMMARY

A new method for shaping a composite material is disclosed herein, which not only addresses the shortcomings of other methods known in the art in terms of lack of automation and utilization of existing infrastructure and equipment, but also provides very low part to part variation and minimal wrinkling, particularly in inner radii.

Accordingly, in one aspect, the present teachings provide methods for shaping a composite material, which generally includes:

(A) positioning a composite system in a press tool, the press tool comprising a male mold and a corresponding female mold separated by a gap, wherein the male mold and the female mold each independently have a non-planar molding surface, (B) compressing the composite system between the male mold and the female mold by closing the gap between the male mold and the female mold; and (C) maintaining the male mold and the female mold in a closed position until the viscosity of the composite system reaches a level sufficient to maintain a molded shape.

The composite system includes at least one woven or non-woven veil having a top surface and a bottom surface and a substantially planar composite material having a top surface and a bottom surface; wherein the bottom surface of the substantially planar composite material is in contact with the top surface of a first woven or non-woven veil; and wherein the at least one woven or non-woven veil is held in place with a structural frame.

In some embodiments, the at least one woven or non-woven veil is stretched across the structural frame. In some embodiments, the structural frame comprises a top frame and a bottom frame, with the at least one woven or non-woven veil held between the top frame and the bottom frame.

In some embodiments, the top surface of the substantially planar composite material is also in contact with the bottom surface of a second woven or non-woven veil, thus forming a layered structure. In this embodiment, the composite material may be held stationary between the first woven or non-woven veil and the second woven or non-woven veil until heat or force is applied to the layered structure.

In other embodiments, the top surface of the substantially planar composite material is also in contact with a diaphragm selected from a film comprising one or more layers, each independently selected from a rubber layer, a silicone layer and a plastic layer.

In some embodiments, the woven or non-woven veil has a weight of between about 5 g/m$^2$ and about 50 g/m$^2$. In some embodiments, the woven or non-woven veil comprises polyester fibers, carbon fibers, glass fibers, or a combination thereof.

In some embodiments, step (B) comprises partially closing the gap between the male mold and the female mold such that a smaller gap is formed between the molds, which smaller gap is subsequently closed after a specific time or viscosity is reached. In other embodiments, step (B) comprises closing the gap between the male mold and the female mold at a speed of between about 0.7 mm/s and about 400 mm/s, while maintaining the male mold and the female mold at a temperature above the softening point of the composite material.

In some embodiments, the male mold and the female mold are maintained at a temperature above ambient temperature, for example a temperature above 100° C.

In some embodiments, step (C) is carried out until the viscosity of the composite material is less than $1.0 \times 10^8$ m Pa.

In some embodiments, the method further includes (D) cooling the composite system on the tool to a temperature that is below the softening temperature of the composite material. In other embodiments, the method further includes (D') removing the composite system from the tool while the composite system is above the softening temperature of the composite material.

In some embodiments, the male mold and female mold are maintained in a closed position for between about 10 seconds and about 30 minutes.

In some embodiments, the composite material in the composite system has been machined to a pattern.

In some embodiments, the method further includes preheating the composite system in a heating apparatus, for example a contact heater or an IR heater, at a temperature sufficient to lower the viscosity of the composite material prior to positioning the composite system in the press tool.

In some embodiments, the composite material comprises structural fibers of a material selected from aramid, high-modulus polyethylene (PE), polyester, poly-p-phenylene-benzobisoxazole (PBO), carbon, glass, quartz, alumina, zirconia, silicon carbide, basalt, natural fibers and combinations thereof.

In some embodiments, the composite material comprises a binder or matrix material selected from thermoplastic polymers, thermoset resins, and combinations thereof. In certain embodiments, the binder or matrix material is present in the composite material in an amount of at least about 40%. In certain embodiments, the binder or matrix material has a viscosity of at least about $1 \times 10^8$ mPa. In certain embodiments,
  either (i) the binder or matrix material has a viscosity of less than $1 \times 10^8$ mPa or (ii) the veil has a weight of less than 100 g/m$^2$; and
  the surface of the composite material is resin rich.

In some embodiments, the method further comprises applying a mold release agent to the male mold, the female mold, or both.

In some embodiments, the composite system is positioned in the optional heating apparatus and in the press tool by automated means. In some embodiments, no vacuum pressure is applied to any portion of the press tool.

DETAILED DESCRIPTION

Figure 1:
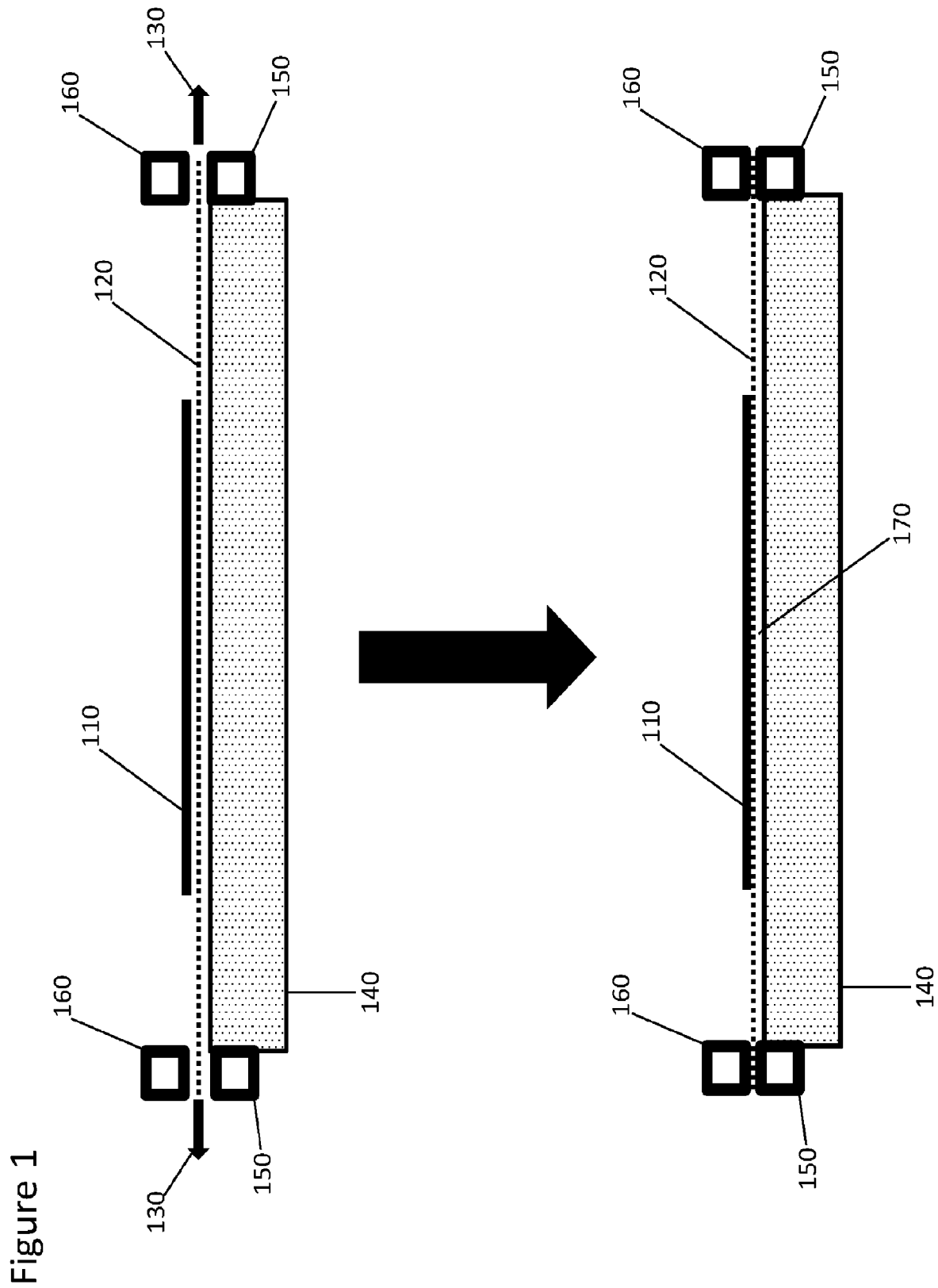
FIG. 1 illustrates an exemplary composite system in accordance with the present teachings.

In view of the potential drawbacks of composite material processing, including processing time, part-to-part variation and visual imperfections, there still exists a need to develop faster, improved and more reliable assemblies and processes. This is particularly true for automotive parts that require visual acceptance, e.g., because they may not be painted or covered. While striving for visual perfection, it is also desirable take full advantage of existing equipment (e.g., metal stamps or presses). However, traditional metal stamping equipment typically results in an imperfect, uneven surface when used directly on composite materials.

The present disclosure provides methods for shaping composite materials using a veil-assisted mechanical thermoforming process, which are capable of using metal stamping tools to produce formed parts having unexpectedly superior surface properties, including a marked lack of wrinkling, e.g., in inner radii.

Processes for Shaping Composite Material

The present teachings include methods for shaping composite materials using the materials described in more detail herein. In some aspects, therefore, the present teachings provide methods for shaping a composite material that generally include:
  (A) positioning a composite system in a press tool, the press tool comprising a male mold and a corresponding female mold separated by a gap, wherein the male mold and the female mold each independently have a non-planar molding surface,
  (B) compressing the composite system between the male mold and the female mold by closing the gap between the male mold and the female mold; and
  (C) maintaining the male mold and the female mold in a closed position until the viscosity of the composite system reaches a level sufficient to maintain a molded shape.

As used herein, the term "composite system" refers to the assembly of materials used for shaping the composite material, and includes at least one woven or non-woven veil having a top surface and a bottom surface and a substantially planar composite material having a top surface and a bottom surface. In the composite system, the bottom surface of the substantially planar composite material is in contact with the top surface of a first woven or non-woven veil and the at least one woven or non-woven veil is held in place with a structural frame.

As used herein, the term "substantially planar" refers to a material that has one plane that is measurably larger than the other two planes (for example, at least 2, 3, 4 or 5 times larger, or more). In some embodiments, the substantially planar material has thickness variation along the largest plane. For example, the composite material may include reinforcement materials such as pad-ups (i.e., localized increases in the quantity of plies) or ply drops (i.e., localized decreases in the quantity of plies), material changes, and/or areas where the composite transitions, e.g., to fabric. In other embodiments, the substantially planar material exhibits minimal thickness variation along the area of the composite material. For example, the term substantially planar can mean that the composite material has a global thickness variation of no greater than +/−15% over 90% of the area. In some embodiments, the thickness variation is no greater than +/−10% over 90% of the area. Substantially planar is not intended to denote a perfectly flat material, but also includes materials that have slight variations in concavity and/or convexity.

Referring now to FIG. 1, in certain embodiments, the substantially planar composite material (110) is placed on the top surface of a woven or non-woven veil (120) that is held in place with a structural frame (150, 160). For example, the woven or non-woven veil can be placed onto a bed (140) which holds a bottom frame (150). The composite material (110) can be subsequently laid on top of the woven or non-woven veil (120), and a top frame (160) can be placed on top of the bottom frame (150), with the woven or non-woven veil sandwiched in between the two frames. In some cases, for example if it is desired to minimize waste around the periphery of the molded part, the composite material can be machined to a pattern prior to placing it on the top surface of the woven or non-woven veil. The woven or non-woven veil can be stretched across the structural frame. Stretching (130) the woven or non-woven veil across the structural frame acts to support the weight of the composite material. Therefore, in some embodiments, the woven or non-woven veil is stretched across the structural frame such that the woven or non-woven veil is capable of supporting the composite material with minimal sagging (170), for example with less than 2.0 cm sag (from the plane of the structural frame), less than 1.0 cm sag, less than 0.5 cm sag, less than 0.25 cm sag, or even less than 0.1 cm sag. In some embodiments, prior to placement of the top frame an additional woven or non-woven veil, or a diaphragm, is added to the top surface of the composite material. The additional woven or non-woven veil or diaphragm forms a layered structure with the composite material (i.e., sandwiching the composite material) that may, in some circumstances, act to hold the composite material more securely in place. If such additional woven or non-woven veil or diaphragm is used, the top frame (160) would be placed on top of the bottom frame (150) such that the woven or non-woven veil and the additional woven or non-woven veil or diaphragm are both sandwiched in between the two frames. A central frame can also be utilized, if it would be advantageous to provide some separation between the woven or non-woven veil and the additional woven or non-woven veil or diaphragm. The top, (optional) central and bottom frames maintain the desired woven or non-woven veil shape through a supported perimeter, e.g., by the positioning of clamps at predetermined intervals around the perimeter. Such frames can be manufactured based on the size and shape of the composite material to be molded. Optionally, pre-manufactured structural support frames are known in the art for use with conventional metal or composite press tools (e.g., from manufacturers such as Langzauner or Schubert).

In some embodiments, the substantially planar composite material (110) is simply laid on the top surface of the woven or non-woven veil (120). In other embodiments, this may be accomplished by physically applying pressure (e.g., by hand or by mechanical means) to the composite material (or to the additional woven or non-woven veil or diaphragm, if used). Once placed, the composite material is considered indexed. That is to say, the composite material may be placed (e.g., by automated means) in a specific position along the X and Y axis on the veil. This indexed composite system may then be placed (e.g., by automated means) in a specific position in the press tool (as described in more detail hereinbelow), such that the press tool consistently engages a predetermined area of the composite material. An indexed composite system may, therefore, be reliably used to produce multiple copies of a molded product without the need to index each composite material blank individually.

Where the additional woven or non-woven veil or diaphragm are used, vacuum pressure may be desired, e.g., to extract residual air which may hinder molding performance, to hinder deformation or wrinkling of the composite material (or its components), to aid in maintaining fiber alignment, to provide support to the materials during the process and during shaping, and/or to maintain desired thickness at elevated temperatures. The term "vacuum pressure" as used herein refers to vacuum pressures of less than 1 atmosphere (or less than 1013 mbar). At this point, whether by vacuum or by mechanical means, the composite material is firmly held between the veil(s)/diaphragm, such that it is stationary until the application of heat or force. Such stationary system can be advantageous, for example, because the composite material is not only maintained stationary in its location with sufficient tension across its X and Y axes, but it is also indexed (as described above).

Figure 2A:
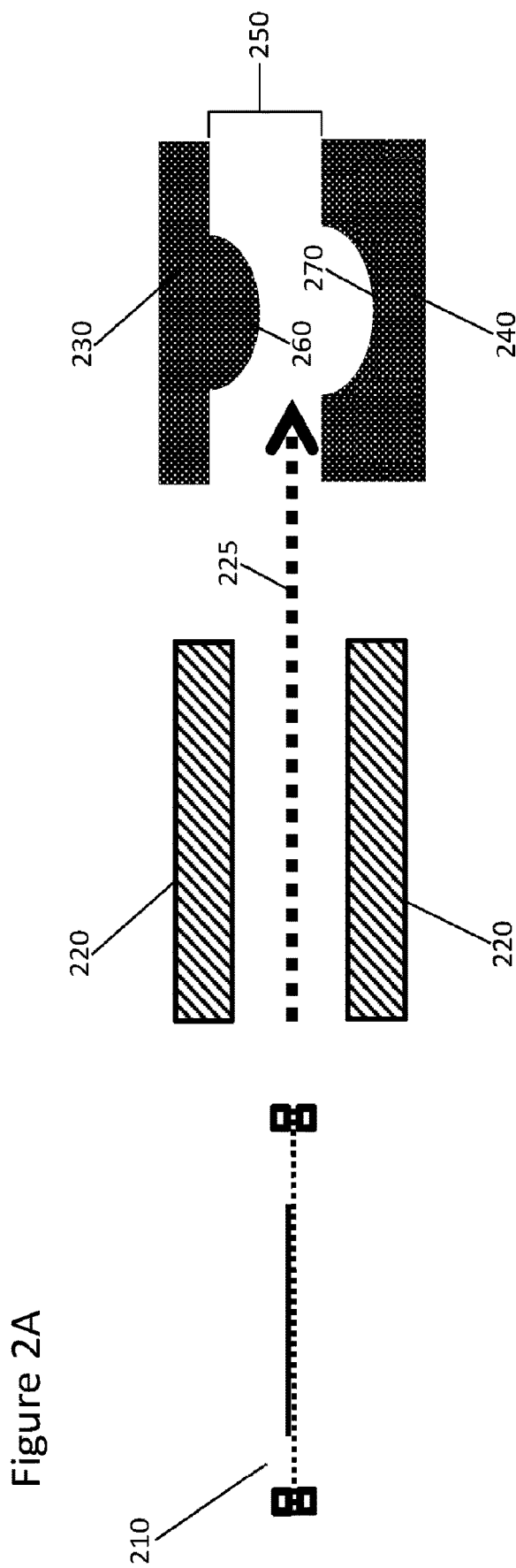
FIGS. 2A and 2B illustrates an exemplary molding process in accordance with the present teachings.

Referring now to FIG. 2A, the composite system (210) may, in some cases, be pre-heated in a heating apparatus (220). The composite system can be placed in the heating apparatus manually or by automated means, e.g., using an automated shuttle (225). This heating apparatus can be any heater that can be used in the formation or molding of metal or composite material products, for example, a contact heater or an infrared (IR) heater. In some cases this pre-heating softens the composite material, the woven or non-woven veil(s), or any optional diaphragm, e.g., so that they are more pliable during formation of the final molded product. In some cases, this pre-heating brings the composite material held within the composite system to a desired viscosity or temperature. Pre-heating may occur in a heating apparatus heated to a temperature of above about 75° C., 100° C., 125° C., 150° C., 175° C., 200° C. or even higher. This temperature can be adjusted, for example, depending upon the identity of the woven or non-woven veil(s), the optional diaphragm and/or the components in the composite material. Such pre-heating is advantageous, for example, if it is desired to minimize or eliminate heating of the press tool and/or to minimize the amount of time that the composite system resides within the press tool.

In order to form the final molded product, the composite system is positioned in a press tool. In some embodiments, no vacuum pressure is applied to any portion of the press tool. In other embodiments, localized vacuum is applied to the tool surface, for example to remove entrapped air between the composite system and the tool. In such embodiments, however, the vacuum is typically not used as a force to form the shape of the final molded product. The composite system can be placed in the press tool manually or by automated means, e.g., using an automated shuttle (225). This press tool generally includes a male mold (230) and a female mold (240), which are separated by a gap (250). Each mold has a non-planar molding surface (260 and 270, respectively). A mold release agent may also be added to the male mold, the female mold, or both. Such mold release agent may be helpful, e.g., for removing the shaped part from the mold while still at temperatures above ambient temperature. The molding surfaces are fixed, i.e., not reconfigurable. The molding surfaces are also typically matched, i.e., the male mold corresponding approximately to the opposite of the female mold; and in some embodiments may be perfectly matched. However, in some embodiments, the male and female molds are such that, when closed, the thickness between them varies. In certain embodiments, the composite system is positioned in the gap at a specific, predetermined distance between the male mold and the female mold.

Figure 2B:
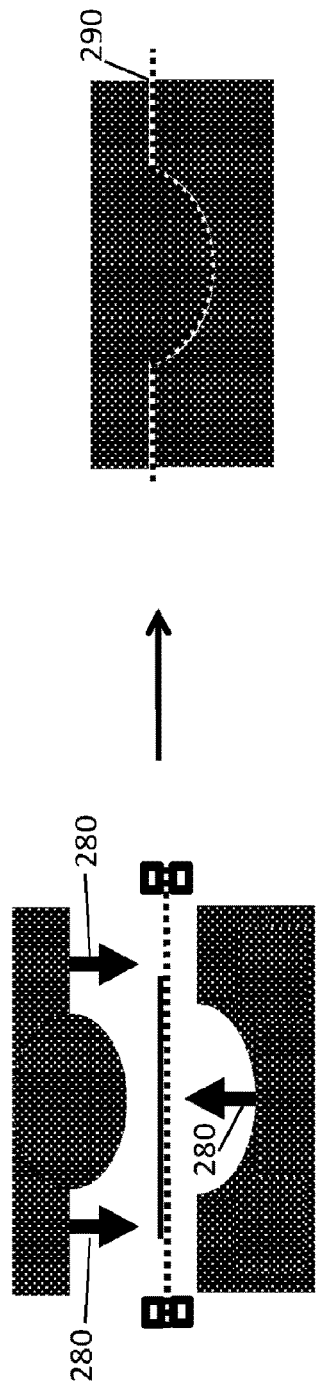

Referring to FIG. 2B, the composite system is then compressed between the male mold and the female mold, by closing the gap (280). In some embodiments, this is accomplished by partially closing the gap between the male mold and the female mold to form a smaller gap between the molds. This smaller gap is subsequently closed after a specific time or viscosity is reached. It is understood that "closing the gap" refers to compressing the molds such that a pre-determined final cavity thickness along the Z axis (290) is obtained between them. Final cavity thickness can be adjusted, e.g., by controlling where the molds stop in relation to each other, and the choice of thickness can be made by the operator of the molds and will depend on the nature of the final molded product. In some embodiments, the final cavity thickness is substantially uniform, i.e., the process produces a two-sided molded final product with a thickness that varies by less than 5%. In some embodiments, the process produces a final molded product with a thickness that varies by less than about 4%, e.g., less than about 3%, less than about 2% or even less than about 1%. In other embodiments, the male and female tools may be configured to provide a cavity thickness that purposely varies across the X and Y axes.

In certain embodiments, the male mold and the female mold are maintained at a temperature above ambient temperature. For example, they may be maintained at a temperature of above about 75° C., 100° C., 125° C., 150° C., 175° C., 200° C. or even higher. This temperature can be adjusted depending upon the identity (and the viscosity) of the components in the composite material. The molds, for example, can be maintained at a temperature above the softening point of the binder or matrix material used in the composite material. In some embodiments, the composite material comprises a thermoset material and molds are maintained at temperatures between about 100° C. and 200° C. In other embodiments, composite material comprises a thermoplastic material and the molds are maintained at temperatures above about 200° C. Typically, the composite system will be heated at some point, for example during the pre-heating step or during the molding process in the press tool or both, to enable softening of the composite material. The binder or matrix material in the composite material is in a solid phase at ambient temperature (20° C.-25° C.), but will soften upon heating. This softening allows molding of the composite material in the press tool.

In some embodiments, the male mold and the female mold are maintained in a closed position for a predetermined time. For example, in some embodiments, the molds are heated and maintained in a closed position until a desired viscosity or temperature is reached. In some embodiments, the molds are maintained in a closed position until the viscosity of the composite material is less than about $1.0 \times 10^8$ m Pa. In some embodiments, the molds are heated and maintained in a closed position until the binder or matrix material begins to cross-link. In other embodiments, the molds are not heated, but are maintained in a closed position for a period of time sufficient for the material to maintain a molded shape. Molds may be maintained in a closed position, e.g., for between about 5 seconds and about 60 minutes, for example, for between about 10 seconds and about 30 minutes or between about 15 seconds and about 15 minutes. The length of time that the molds are maintained in a closed position will depend upon a number of factors, including the identity of the composite material and the temperature of the molds.

In certain embodiments, the male mold is driven through the composite system, while the female mold remains static. In other embodiments, the female mold does not remain static, but moves at a rate that is slower than the male mold (such that the male mold still acts predominantly as the forming surface). In still other embodiments, both molds move at approximately the same rate of speed to close the gap between the molds. The molds are driven at a rate and to a final pressure sufficient to deform/mold the composite material. For example, the molds may be driven at a rate of between about 0.4 mm/s and about 500 mm/s, e.g., between about 0.7 mm/s and about 400 mm/s, e.g., between about 10 mm/s and about 350 mm/s or between about 50 mm/s and 300 mm/s. Additionally, the molds may be driven to a final pressure of between about 100 psi and about 1000 psi, e.g., between about 250 psi and about 750 psi. In some embodiments, the molds are driven at a rate and to a final pressure that have been selected to control the thickness of the final molded product while avoiding the formation of wrinkles and the distortion of structural fibers. In addition, the molds may be driven at a rate and to a final pressure that have been selected to allow the rapid formation of final molded parts. It is noted that the present teachings are not intended to be limited by the depiction in FIGS. 2A and 2B of the female mold in contact with the veil surface of the composite system. Indeed, in some embodiments, the male mold in in contact with the vile surface of the composite system. Without wishing to be bound by any particular theory, it is believed that this configuration may minimize the wrinkling in the inner radii.

The composite system is then cooled to below the softening temperature of the binder or matrix material. This can occur while the composite system remains on the press tool, or after the composite system is removed from the press tool. At this point, the binder or matrix material returns to a solid phase and the composite material retains its newly formed geometry. If the composite material is a preform, such preform will hold its desired shape for subsequent resin infusion.

In addition to superior surface qualities, the present method can reduce the requirement of post-cure machining to achieve the final geometry of structural parts. This post-cure processing is not only time-consuming, but also very risky because cured structural parts cannot be re-shaped. Therefore, damage incurred during post-cure processing can result in the part being scrapped. Thus, in some embodiments, the present process includes the step of machining the composite material prior to placing it on the woven or non-woven veil. This allows for automated, efficient and easy machining of the composite material, instead of a complex process of programming, positioning, and cutting of a cured three-dimensional composite material.

The system described above not only aids in the molding of composite materials, e.g., by maintaining the composite material in a stationary position with sufficient tension across its X and Y axes, but also provides an effective and efficient means for producing complex three-dimensional composite structures having excellent surface characteristics in an automated fashion. Three-dimensional composite structures can be produced quickly, repeatedly and on a large-scale. For example, three-dimensional composite structures can be formed from substantially planar composite material blanks in 1-10 minute cycles. Such quick, repeatable processes are suitable for the manufacture of automotive parts and paneling, such as hoods, trunks, door panels, fenders and wheel wells.

Woven or Non-Woven Veil

As used herein, the term "veil" refers to a thin mat of continuous or chopped polymer fibers. The fibers may be yarns or monofilaments of spun strands. Typically, veils are resin-soluble and can generally be woven (e.g., in a controlled arrangement) or non-woven (e.g., partially or completely random). Veils have been generally used in composite materials, e.g., to increase the toughness in composite articles manufactured by liquid resin infusion processes by interposing such veils between plies of structural reinforcement fiber.

The weight of the veil(s) used in connection with the present methods can vary, but are typically between about 5 $g/m^2$ and about 100 $g/m^2$. In some embodiments, the woven or non-woven veil has a weight of less than about 75 $g/m^2$, less than about 60 $g/m^2$, or less than about 50 $g/m^2$. In some embodiments, the woven or non-woven veil has a weight of between about 5 $g/m^2$ and about 50 $g/m^2$. For example, in some embodiments, the woven or non-woven veil has a weight of between about 10 g/m² and about 40 g/m². In certain embodiments, the woven or non-woven veil has a weight of between about 15 g/m² and about 30 g/m²; for example about 15 g/m², about 16 g/m², about 17 g/m², about 18 g/m², about 19 g/m², about 20 g/m², about 21 g/m², about 22 g/m², about 23 g/m², about 24 g/m², about 25 g/m², etc.

The selection of veil weight can be determined based on the attributes of the composite material being shaped. For example, a more viscous binder or matrix material may require a heavier veil (or more than one veil), whereas a less viscous binder may utilize a lighter veil. Similarly, if the surface of the composite material is resin-rich, the veil can be selected such that the resin does not over-permeate the veil. In certain embodiments:
  either (i) the binder or matrix material has a viscosity of less than $1\times10^8$ mPa or (ii) the veil has a weight of less than 100 g/m²; and
  the surface of the composite material is resin rich.

The material used in the veil is not particularly limited, and can be any veil known for use in connection with composite materials. However, in some embodiments, the woven or non-woven veil comprises polyester fibers, carbon fibers, aramid fibers, glass fibers, or a combination thereof. In other embodiments, the woven or non-woven veil comprises fibers of resin-soluble polymers, such as those identified in US 2006/0252334 to LoFaro et al., which is incorporated herein by this reference. In some embodiments, the woven or non-woven veil comprises polyester fibers. In some embodiments, the veil is a non-woven veil comprising polyester fibers. In some embodiments, the veil is a woven veil comprising polyester fibers. In other embodiments, the woven or non-woven veil comprises carbon fibers. For example, in some embodiments, the veil is a non-woven veil comprising carbon fibers. In some embodiments, the veil is a woven veil comprising carbon fibers. In still other embodiments, the woven or non-woven veil comprises glass fibers. In some embodiments, the veil is a non-woven veil comprising glass fibers. In some embodiments, the veil is a woven veil comprising glass fibers.

Composite Materials

As used herein, the term "composite material" refers to an assembly of structural fibers and a binder or matrix material. Structural fibers may be organic fibers, inorganic fibers or mixtures thereof, including for example commercially available structural fibers such as carbon fibers, glass fibers, aramid fibers (e.g., Kevlar), high-modulus polyethylene (PE) fibers, polyester fibers, poly-p-phenylene-benzobisoxazole (PBO) fibers, quartz fibers, alumina fibers, zirconia fibers, silicon carbide fibers, other ceramic fibers, basalt, natural fibers and mixtures thereof. It is noted that end uses that require high-strength composite structures would typically employ fibers having a high tensile strength (e.g., ≥3500 MPa or ≥500 ksi). Such structural fibers may include one or multiple layers of fibrous material in any conventional configuration, including for example, unidirectional tape (uni-tape) webs, non-woven mats or veils, woven fabrics, knitted fabrics, non-crimped fabrics, fiber tows and combinations thereof. It is to be understood that structural fibers may be included as one or multiple plies across all or a portion of the composite material, or in the form of pad-ups or ply drops, with localised increases/decreases in thickness.

The fibrous material is held in place and stabilized by a binder or matrix material, such that alignment of the fibrous material is maintained and the stabilized material can stored, transported and handled (e.g., shaped or otherwise deformed) without fraying, unraveling, pulling apart, buckling, wrinkling or otherwise reducing the integrity of the fibrous material. Fibrous materials held by a small amount of binder (e.g., typically less than about 10% by weight) are typically referred to as fibrous preforms. Such preforms would be suitable for resin infusion applications, such as RTM. Fibrous materials may also be held by larger amounts of matrix materials (generally called "prepregs" when referring to fibers impregnated with a matrix), and would thus be suitable for final product formation without further addition of resin. In certain embodiments, the binder or matrix material is present in the composite material in an amount of at least about 30%, at least about 45%, at least about 40%, or at least about 45%.

The binder or matrix material is generally selected from thermoplastic polymers, thermoset resins, and combinations thereof. When used to form a preform, such thermoplastic polymers and thermoset resins may be introduced in various forms, such as powder, spray, liquid, paste, film, fibers, and non-woven veils. Means for utilizing these various forms are generally known in the art.

Thermoplastic materials include, for example, polyesters, polyamides, polyimides, polycarbonates, poly(methyl methacrylates), polyaromatics, polyesteramides, polyamideimides, polyetherimides, polyaramides, polyarylates, polyaryletherketones, polyetheretherketones, polyetherketoneketones, polyacrylates, poly(ester) carbonates, poly(methyl methacrylates/butyl acrylates), polysulphones, polyarylsulphones, copolymers thereof and combinations thereof. In some embodiments, the thermoplastic material may also include one or more reactive end groups, such as amine or hydroxyl groups, which are reactive to epoxides or curing agents.

Thermoset materials include, for example, epoxy resins, bismaleimide resins, formaldehyde-condensate resins (including formaldehyde-phenol resins), cyanate resins, isocyanate resins, phenolic resins and mixtures thereof. The epoxy resin may be mono or poly-glycidyl derivative of one or more compounds selected from the group consisting of aromatic diamines, aromatic monoprimary amines, aminophenols, polyhydric phenols, polyhydric alcohols, and polycarboxylic acids. The epoxy resins may also be multifunctional (e.g., di-functional, tri-functional, and tetra-functional epoxies).

In some embodiments, a combination of thermoplastic polymer(s) and thermoset resin(s) are used in the composite material. For example, certain combinations may operate with synergistic effect concerning flow control and flexibility. In such combinations, the thermoplastic polymers would provide flow control and flexibility to the blend, dominating the typically low viscosity, brittle thermoset resins.

Optional Diaphragm

As used herein, a "diaphragm" refers to a flexible barrier that divides or separates two distinct physical area, and which is an elastic or non-elastically deformable sheet of material. As used herein, the term "flexible" refers to a material capable of deformation without significant return forces. Flexible materials typically have a flexibility factor (the product of the Young's modulus measured in Pascals and the overall thickness measured in meters) of between about 1,000 N/m and about 2,500,000 N/m. Typically, diaphragm thickness ranges between about 10 microns and about 200 microns, for example, between about 30 microns and about 100 microns.

The material used to make the diaphragms can be, for example, rubbers, silicones, plastics, thermoplastics, or similar materials. In certain embodiments, however, the material used to make the diaphragms includes a film comprising one or more layers, each independently selected from a plastic layer or an elastic layer. In some embodiments, a diaphragm material is chosen to easily release from the final molded part and/or the tooling. In other embodiments, the diaphragm is designed to temporarily or permanently adhere to the molded composite material. Diaphragm material can be formed into a film using conventional casting or extrusion procedures.

Exemplification

The following examples are for illustration purposes only, and are not to be construed as limiting the scope of the appended claims.

Comparative Example 1: Double Diaphragm Mechanical Thermoforming

A lower flexible diaphragm made of a plastic film (Solvay, formerly Cytec Industries, EMX045) was placed on a bed holding a bottom frame. A composite material blank made of a carbon-fiber reinforced epoxy was laid on top of the lower flexible diaphragm, followed by center frame having a vacuum inlet. An upper flexible diaphragm made of the same film as the lower flexible diaphragm was then placed such that it covered the center frame and composite material blank. The top, center and bottom frames were clamped together, thereby creating a pocket bounded by the lower flexible diaphragm, the upper flexible diaphragm and the center frame. A vacuum was then applied to remove air from between the upper flexible diaphragm and the lower flexible diaphragm.

The framed apparatus was then shuttled into a contact heating apparatus, where it was heated to 110° C. Subsequent to heating with the contact heater, the framed apparatus was shuttled into a press tool comprising a matched male mold and female mold, configured in the shape of a structural automotive component. The male mold was then driven toward the female mold at a rate of approximately 200 mm/s. The female mold remained stationary, and both molds were held at 140° C. until cross linking had begun. The shaped structure was removed from the press tool while still hot and allowed to cool after removal.

Figure 3:
FIG. 3 is a photographic comparison of an exemplary part formed using a double diaphragm mechanical thermoforming method with an exemplary part formed using the methods disclosed herein.
Figure 3:
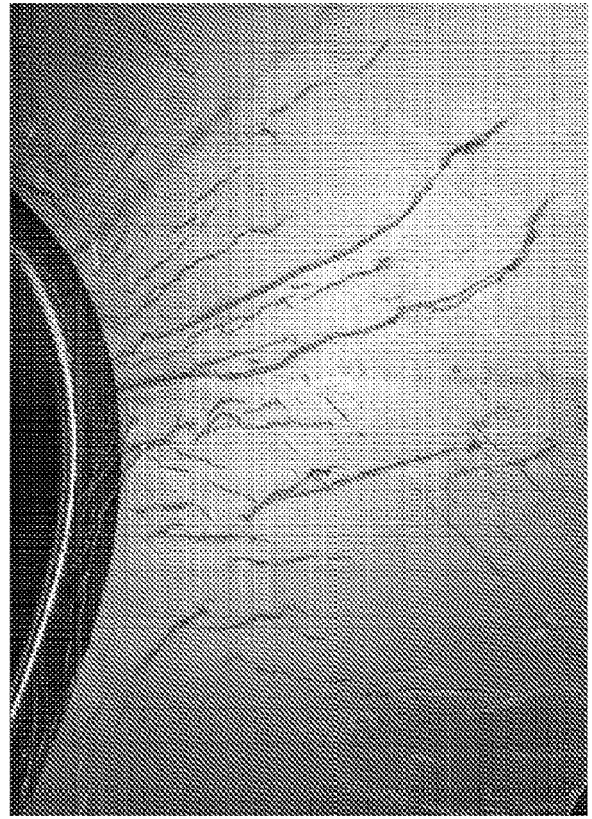

A portion of the shaped structure is depicted in FIG. 3, frame A. The double diaphragm method provides an exceptional means for quickly forming composite materials on pre-existing metal tools. However, as shown in FIG. 3, frame A, parts formed using this method are sometimes prone to wrinkling, particularly on inner radii.

Example 2: Mechanical Thermoforming with Veil

A woven polyester veil was placed onto a bed, while being stretched across a bottom frame. A top structural frame was added on top of the bottom frame, with the polyester veil held in between the two structural frames. The top and bottom frames were then clamped together, thereby holding the polyester veil in a stretched position. A composite material blank made of the same carbon-fiber reinforced epoxy used in comparative Example 1 was then laid on top of the polyester veil. This framed apparatus was then processed in the same manner as in comparative Example 1.

A portion of the shaped structure is depicted in FIG. 3, frame B. As shown in FIG. 3, frame B, methods according to the present invention not only provide an exceptional means for quickly forming composite materials on pre-existing metal tools, but also are unexpectedly capable of forming parts having significantly and consistently less wrinkling, particularly on inner radii. It is noted that the portion depicted in FIG. 3, frame B is generally indicative of the bulk formed part.

The invention claimed is:

1. A method for shaping a composite material, the method comprising:
   A. positioning a composite system in a press tool, the press tool comprising a male mold and a corresponding female mold separated by a gap, wherein the male mold and the female mold each independently have a non-planar molding surface,
   B. compressing the composite system between the male mold and the female mold by closing the gap between the male mold and the female mold; and
   C. maintaining the male mold and the female mold in a closed position until the viscosity of the composite system reaches a level sufficient to maintain a molded shape,
   wherein the composite system comprises at least one woven or non-woven veil having a top surface and a bottom surface and a substantially planar composite material having a top surface and a bottom surface;
   wherein the bottom surface of the substantially planar composite material is in contact with the top surface of a first woven or non-woven veil of the at least one woven or non-woven veil; and
   wherein the at least one woven or non-woven veil is held in place in the composite system with a structural frame including a top frame and a bottom frame.

2. The method of claim 1, wherein the at least one woven or non-woven veil is stretched across the structural frame.

3. The method of claim 1, wherein the top surface of the substantially planar composite material is also in contact with the bottom surface of a second woven or non-woven veil, thus forming a layered structure.

4. The method of claim 3, wherein the composite material is held stationary between the first woven or non-woven veil and the second woven or non-woven veil until heat or force is applied to the layered structure.

5. The method of claim 1, wherein the top surface of the substantially planar composite material is also in contact with a diaphragm selected from a film comprising one or more layers, each independently selected from a rubber layer, a silicone layer and a plastic layer.

6. The method of claim 1, wherein the structural frame comprises a top frame and a bottom frame, with the at least one woven or non-woven veil held between the top frame and the bottom frame.

7. The method of claim 1, wherein the woven or non-woven veil has a weight of between 5 g/m2 and 50 g/m2.

8. The method of claim 1, wherein the woven or non-woven veil comprises polyester fibers, carbon fibers, glass fibers, or a combination thereof.

9. The method of claim 1, wherein step (B) comprises partially closing the gap between the male mold and the female mold such that a smaller gap is formed between the molds, which smaller gap is subsequently closed after a specific time or viscosity is reached.

10. The method of claim 1, wherein step (B) comprises closing the gap between the male mold and the female mold at a speed of between 0.7 mm/sand 400 mm/s, while maintaining the male mold and the female mold at a temperature above the softening point of the composite material.

11. The method of claim 1, wherein the composite material in the composite system has been machined to a pattern.

12. The method of claim 1, further comprising pre-heating the composite system in a heating apparatus at a temperature sufficient to lower the viscosity of the composite material prior to positioning the composite system in the press tool.

13. The method of claim 1, wherein the composite material comprises structural fibers of a material selected from aramid, high- modulus polyethylene (PE), polyester, poly-p-phenylene-benzobisoxazole (PBO), carbon, glass, quartz, alumina, zirconia, silicon carbide, basalt, natural fibers and combinations thereof.

14. The method of claim 1, wherein the composite material comprises a binder or matrix material selected from thermoplastic polymers, thermoset resins, and combinations thereof.

15. The method of claim 14, wherein the binder or matrix material is present in the composite material in an amount of at least 40% by weight.

16. The method of claim 14, wherein the binder or matrix material has a viscosity of at least 1×108 mPa.

17. The method of claim 14, wherein:
either
(i) the binder or matrix material has a viscosity of less than $1 \times 10^8$ mPa or
(ii) the veil has a weight of less than 100 g/m$^2$.

18. The method of claim 1, wherein the method further comprises applying a mold release agent to the male mold, the female mold, or both.

19. The method of claim 1, wherein the composite system is positioned in an optional heating apparatus and in the press tool by automated means.

20. The method of claim 1, wherein no vacuum pressure is applied to any portion of the press tool.

* * * * *